United States Patent Office 2,744,139
Patented May 1, 1956

2,744,139
BASIC ETHERS OF PHENOLS

Stephen B. Binkley, Wheaton, Ill., and Lee C. Cheney, Fayetteville, N. Y., assignors to Bristol Laboratories Inc., Syracuse, N. Y., a corporation of New York No Drawing. Application February 18, 1953, Serial No. 337,664

5 Claims. (Cl. 260—567.6)

This invention relates to basic ethers of alpha-allyl-beta-naphthol which are of therapeutic value as antifungal agents, as antihistaminic agents, as antispasmodics and as local anesthetic agents.

This application is a continuation-in-part of our prior copending application, Serial No. 182,412, filed August 30, 1950, now Patent No. 2,703,324.

This invention relates to new compounds having the general formula

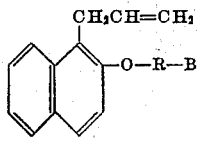

where R is an alkylene group containing 2 to 6 carbon atoms in the carbon chain thereof and B is di (lower) alkylamino, piperidino, morpholino, pyrrolidino, lower alkyl-pyrrolidino, N'-alkylpiperazino or pipecolino, as the free bases, as the acid addition salts and as the quaternary salts.

Examples of the acid addition salts of the basic ethers with inorganic or organic acids which may be prepared by the methods hereinafter disclosed are the hydrochloride, hydrobromide, hydroiodide, sulfate, phosphate, maleate, acetate, citrate, oxalate, succinate, benzoate, tartrate, phthalate, picrate, fumarate, 8-chlorotheophyllinate and the like.

The quaternary salts of this invention are prepared by causing substituted-aminoalkyl ethers of alpha-allyl-beta-naphthol to react with alkyl halides, aralkyl halides, alkyl sulfates or alkyl-p-toluenesulfonates. Alternatively, the quaternary salts are prepared by causing a haloalkyl ether of alpha-allyl-beta-naphthol to react with a tertiary amine.

The compounds of this invention are prepared by reacting a tertiary-amino-alkyl halide with an alkali metal salt, e. g. sodium, lithium, of alpha-allyl-beta-naphthol. Alternatively, the compounds of this invention are prepared by reacting a haloalkyl ether of alpha-allyl-beta-naphthol with a tertiary amine.

The following examples are given to illustrate the scope of this invention without limiting it thereto.

Example I

Alpha-allyl-beta-naphthol is prepared according to Claisen, Ber. 45, 3157 (1912), or according to the following directions:

A solution of 144 g. (1.0 mole) of beta-naphthol in 600 cc. xylene is added rapidly to a suspension of 24 g. (1.0 mole) of sodium hydride in 400 cc. xylene, under nitrogen atmosphere. The mixture is heated to reflux; the addition of 133 g. (1.1 moles) of allyl bromide is begun, even though some sodium hydride may remain, and is completed in about four hours. A voluminous tan precipitate forms. The mixture is stirred and refluxed for an additional sixteen hours and then hydrolyzed with dilute acid. The xylene layer is separated and the xylene is removed by distillation. The residue is taken up in 400 cc. of Claisen's alkali, extracted several times with Skellysolve D, and the basic solution is then acidified with hydrochloric acid and the product, alpha-allyl-beta-naphthol, is extracted into ether. The ethereal solution is dried and the ether is removed by distillation. Distillation of the residue yields alpha-allyl-beta-naphthol boiling at about 127°–128° C. at less than one mm.

Example II

A fresh solution of β-dimethylaminoethyl chloride in toluene is rapidly prepared using cold aqueous sodium hydroxide to liberate the free base from 37.4 g. (0.26 mole) of β-dimethylaminoethyl chloride hydrochloride.

To a suspension of 4.8 g. (0.2 mole) of sodium hydride in 100 cc. toluene is added dropwise a solution of 36.8 g. (0.2 mole) of alpha-allyl-beta-naphthol in 100 cc. toluene. The mixture is refluxed for about two hours and practically all the solid sodium hydride reacts and disappears, leaving a clear solution. To this refluxing solution is added dropwise the above solution of dimethylaminoethyl hydrochloride. The mixture is stirred and refluxed for twelve hours and hydrolyzed with water. The toluene layer is separated, washed with ten per cent potassium hydroxide and dried. Upon distillation there is obtained alpha - allyl - beta - naphthyl β-dimethylaminoetyhl ether boiling at about 139°–143° C. at about one mm.

Alpha - allyl - beta - naphthyl beta-dimethylaminoethyl ether (40 g.) is dissolved in diethyl ether (300 cc.) and the solution is acidified with dry hydrogen chloride. White, crystalline alpha-allyl-beta-naphthyl beta-dimethylaminoethyl ether hydrochloride precipitates, is collected by filtration after standing in the cold for two days and melts at about 151.0°–152.5° C. after repeated recrystallization from isopropyl alcohol and from mixtures of isopropyl alcohol and Skellysolve B.

Analysis.—Calculated for $C_{17}H_{22}ONCl$:

|   | Calculated | Found |
|---|---|---|
| C | 69.96 | 70.2 |
| H | 7.60 | 7.91 |

Alpha - allyl - beta - naphthyl beta-dimethylaminoethyl ether (2.55 grams) is refluxed in methyl iodide (14.2 grams) for twelve hours. Unreacted methyl iodide is removed by distillation on the steam bath, leaving as the residue the salt-like alpha-allyl-beta-naphthyl beta-dimethylaminoethyl ether methiodide.

This invention also contemplates the quaternary salts of the free bases of the general formula above, which may be prepared as made apparent in the examples above by treatment of the free bases with quaternary salt-forming substances. These quaternary salt-forming substances include methyl chloride, methyl bromide, methyl iodide, ethyl chloride, ethyl bromide, ethyl iodide, n-propyl chloride, n-propyl bromide, n-propyl iodide, isopropyl bromide, n-butyl chloride, n-butyl bromide, isobutyl bromide, sec.-butyl bromide, n-amyl bromide, n-hexyl chloride, benzyl chloride, benzyl bromide, methyl sulfate, ethyl sulfate, methyl benzenesulfonate, methyl p-toluenesulfonate, etc. which will react directly with any free base of the general formula above to give respectively the methochloride, methobromide, methiodide, ethochloride, ethobromide, ethiodide, n-propochloride, n-propobromide, n-propiodide, isopropobromide, n-butochloride, n-butobromide, isobutobromide, sec.-butobromide, n-amobromide, n-hexochloride, benzochloride, benzobromide, methosulfate, ethosulfate, methobenzenesulfonate, metho-p-toluenesulfonate, etc.

The invention also includes the non-toxic organic and inorganic acid addition salts of the compounds having the general formula above such as will be readily formed with, for example, organic and inorganic acids such as hydrochloric, sulfuric, sulfamic, tartaric, hydrobromic, hydriodic, glycolic, citric, maleic, phosphoric, succinic, acetic, benzoic, cinnamic, mandelic, malic, ascorbic and the like. The method of preparation of these salts is made apparent in the examples above.

We claim:

1. A member selected from the group consisting of the free bases, the non-toxic acid addition salts and the non-toxic quaternary salts of ethers having the general formula

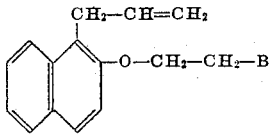

where B represents di (lower) alkylamino.

2. A member selected from the group consisting of the free base, the non-toxic acid addition salts and the non-toxic quaternary salts of the ether having the formula

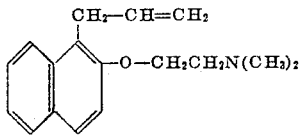

3. Alpha-allyl-beta-naphthyl beta-dimethylaminoethyl ether.

4. Non-toxic acid addition salts of alpha-allyl-beta-naphthyl beta-dimethylaminoethyl ether.

5. Non-toxic quaternary salts of alpha-allyl-beta-naphthyl beta-dimethylaminoethyl ether.

No references cited.